United States Patent [19]

Majima

[11] Patent Number: 4,615,427

[45] Date of Patent: Oct. 7, 1986

[54] CLUTCH DISK HAVING COMBINED ORGANIC AND CERAMIC-METALLIC FACINGS

[75] Inventor: Hidekazu Majima, Neyagawa, Japan

[73] Assignee: Kabushiki Kaisha Daikin Seisakusho, Osaka, Japan

[21] Appl. No.: 778,171

[22] Filed: Sep. 19, 1985

[30] Foreign Application Priority Data

Jul. 7, 1981 [JP] Japan ............................ 56-101525[U]

[51] Int. Cl.⁴ .............................................. F16D 69/02
[52] U.S. Cl. ........................... 192/107 M; 192/107 R
[58] Field of Search .......... 192/70.14, 107 M, 107 R; 188/218 XL, 251 A

[56] References Cited

U.S. PATENT DOCUMENTS

| | | | |
|---|---|---|---|
| 1,958,319 | 5/1934 | Stanley | 192/70.14 |
| 2,554,548 | 5/1951 | Albagnac | 192/107 M |
| 2,728,700 | 12/1955 | Gatke | 192/107 M |
| 2,986,252 | 5/1961 | DuBois | 192/107 M |
| 3,902,578 | 9/1975 | Berger et al. | 192/107 R |
| 4,202,432 | 5/1980 | Komori | 192/107 M |
| 4,305,494 | 12/1981 | Ishida et al. | 192/107 M |

OTHER PUBLICATIONS

Bendix Corporation, "Less Time and Cost for Maintenance", Feb. 1957.

"Cerametalix Friction Lining", Bendix Corporation, Jan. 1957.

Primary Examiner—Rodney H. Bonck
Attorney, Agent, or Firm—Armstrong, Nikaido, Marmelstein & Kubovcik

[57] ABSTRACT

A clutch disk having a plate and a spline hub and a organic and ceramic-metallic facing fixed to the opposite faces of the plate in back-to-back positions on the opposite faces and fixed to the plate with rivets passing through the plate and facings, the opposite ends of the rivets being recessed in the facings, the organic facing having a plurality of equally spaced notches extending radially inwardly from and circumferentially along the periphery of the disk, the peripheral edge of the notches being open for the circumferential length of the notches, the ceramic-metallic friction facing filling the notches.

8 Claims, 6 Drawing Figures

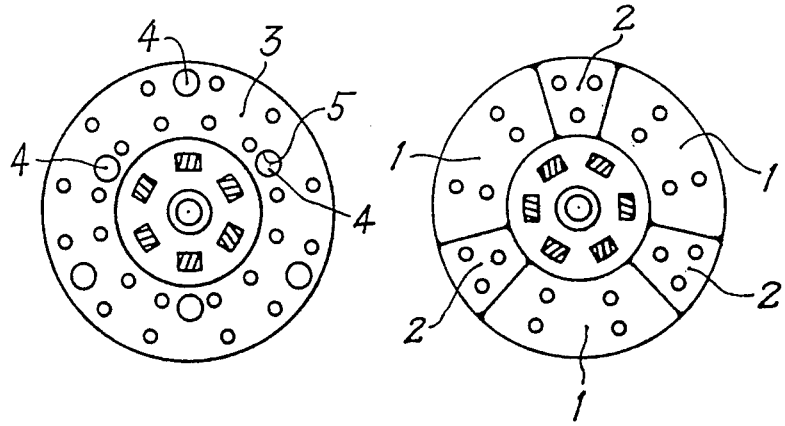
FIG. 2 PRIOR ART
FIG. 1 PRIOR ART
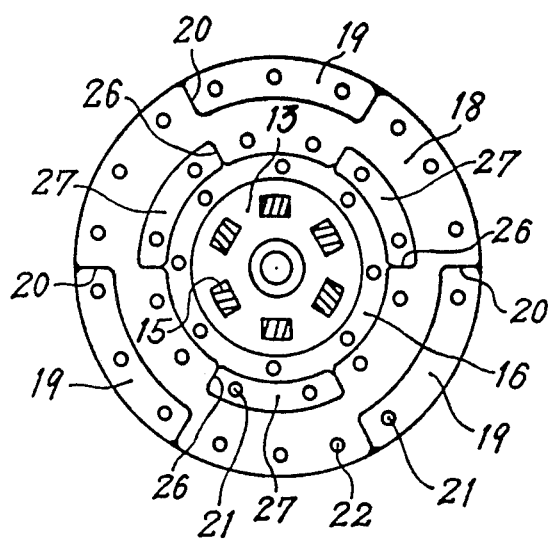
FIG. 5

CLUTCH DISK HAVING COMBINED ORGANIC AND CERAMIC-METALLIC FACINGS

BACKGROUND OF THE INVENTION

This invention relates to a clutch disk, and especially to a clutch disk provided with a facing having an organic facing in combination with a ceramic-metallic facing.

The term "organic material" as used in this application means a material in which a mixture, for example, of asbestos and metal wires of brass or other metal, is molded with phenol resin, etc. The organic facing has high torque transmitting efficiency and good shudder-preventitive properties, but has disadvantages in wear-resistance and heat-resisting properties. A ceramic-metallic material comprises a main material of sintered alloy to which ceramic-metallic inorganic substance is compounded. The ceramic-metallic material, as a clutch facing, is superior to organic material in wear-resisting and heat-resisting properties. Therefore, an idea of utilizing a clutch facing having a combination of both of the above facings has been proposed for the purpose of complementing the wear-resisting and heat-resisting properties of ceramic-metallic material with the torque transmitting efficiency and shudder-preventitive properties of organic material.

Among the above proposed combined facings, one is the facing in which the ceramic-metallic facings 2, FIG. 1, are arranged between organic facings 1 dividing the clutch face into several circular arc pieces as shown in FIG. 1, and as shown in FIG. 2 in which the facings include many fitting recessions 5 formed in an annular organic facing 3 with ceramic-metallic facings 4 arranged in the recessions 5.

However, the facing shown in FIG. 1 has a low anti-bursting strength because the organic facing 1 is divided into several pieces. The facing shown in FIG. 2 has a disadvantage of requiring much labor in manufacturing.

An object of this invention is to overcome the above troubles and to provide a clutch disk provided with a facing having a high anti-bursting strength which requires less labor in manufacturing, and has superior economy.

In order to achieve the above object, in this invention the organic facing is formed into an integral annular piece with notched portions provided at plural places on the outer periphery thereof. The organic facing is fixed onto both sides of a driven plate. The ceramic-metallic facings are arranged in the notched portions and fixed to the driven plate.

BRIEF DESCRIPTION OF THE DRAWINGS

FIG. 1 and FIG. 2 are front views of prior art clutch disks.

FIG. 5 and FIG. 6 are front views showing other embodiments of the invention.

DETAILED DESCRIPTION OF THE INVENTION

Figure 3:
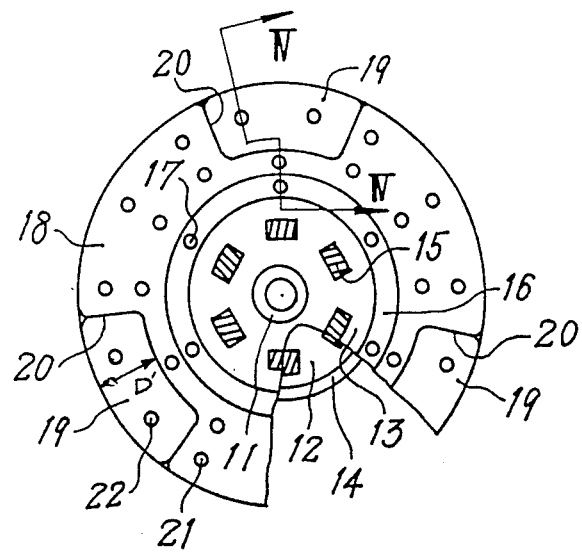
FIG. 3 is a partially cutaway front view of the clutch disk in accordance with the present invention.

FIG. 3 shows a partially cutaway front view of the clutch disk in accordance with the present invention. In FIG. 3, 11 is an output side spline hub and 12 is an outward flange formed on hub 11. An annular clutch plate 13 and a retaining plate 14 are arranged on the opposite sides of the flange 12. Torque is transmitted from the clutch plate 13 and the retaining plate 14 through plural coil springs 15 to the flange 12 and the hub 11 as in the case with a conventional clutch disk. The clutch plate 13 and the retaining plate 14 are so connected, in conventional manner to rotate together by means of stud pins (not shown in the Figure) distributed at plural places on the circumference.

An inner peripheral edge of a flatly and annularly shaped driven plate 16 is fixed to an outer peripheral edge of the clutch plate 13 with rivets 17. Organic facings 18 and a ceramic-metallic facing 19 are fixed to the opposite sides of driven plate 16.

The organic facing 18 is formed into an integral annular piece with circuit arc-shaped notched portions 20 having a prescribed width D' in the radial direction are formed, for example, in three positions, on the outer peripheral edge with the same distances between the notched portions in the circumferential direction. The ceramic-metallic facing 19 is formed into approximately the same circular arc-shaped figure as the notched portion 20 but a little smaller than the notched portion 20 so that the facing can be fitted into the notched portion 20. The organic facing 18 and the ceramic-metallic facing 19 are independently fixed on the driven plate 16 by means of rivets 21 and 22.

Figure 4:
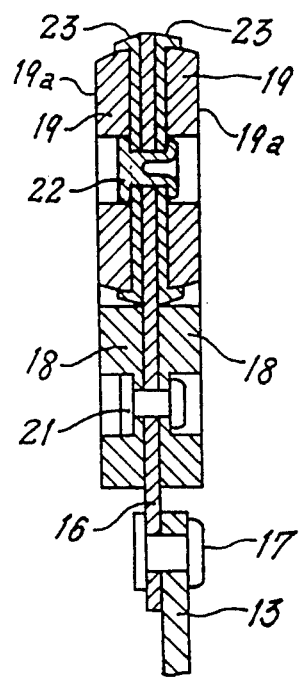
FIG. 4 is a partially sectional view taken substantially on the line IV—IV of FIG. 3.

In FIG. 4 showing the vertical sectional view taken on the line IV—IV of FIG. 3, the ceramic-metallic facing 19 is held by a cup-shaped holder 23 so that a side portion of frictional surface 19a projects out from a side of the holder 23 and is fixed to the driven plate 16 by rivets 22 through holder 23 and driven plate 16. The ceramic-metallic facings 19 on the opposite sides of the driven plate 16 are arranged on opposite sides at the same portion of the driven plate. Thus, both ceramic-metallic facings 19 are simultaneously fixed to the driven plate by the rivets 22. Furthermore, both organic facings 18 are simultaneously fixed to the driven plate 16 by the rivet 21 in the same manner as the above.

The clutch disk, as shown in FIG. 3 and FIG. 4, has a very high anti-bursting strength because an inner peripheral portion of the organic facing 18, which will cause starting points of cracks when increasing rotational speed, is continuously joined over the entire circumference without breaks.

FIG. 5 shows another embodiment of the present invention. In addition to the notched portions 20 on the outer peripheral edge of the organic facing 18 in this FIG. 5, notched portions 26 of the same number as the outer discs are formed on the inner peripheral part. Ceramic-metallic facings 27 are arranged in the inner notched portions 26 in the same manner as in the outer notches. The inner peripheral side notched portion 26 is formed between the outer peripheral side notched portions 20 in the circumferential direction, and both edges in the circumferential direction of the inner peripheral notched portion 26 are situated on the same radial line with both edges in the circumferential direction of both adjacent outer peripheral notched portions 20. Namely, the clutch facing is so devised that the ceramic-metallic facing 19 or 27 always exists on either the inner peripheral side or the outer peripheral side over the entire circumference of the organic facing 18.

Since the organic facing 18 is formed into an integral piece as shown in FIG. 5, its anti-bursting strength is very high, and moreover its wear-resisting and heat-resisting properties are improved by a large margin owing to the ceramic-metallic facings 19 and 27 existing over the entire circumference of the organic facing 18.

Figure 6:
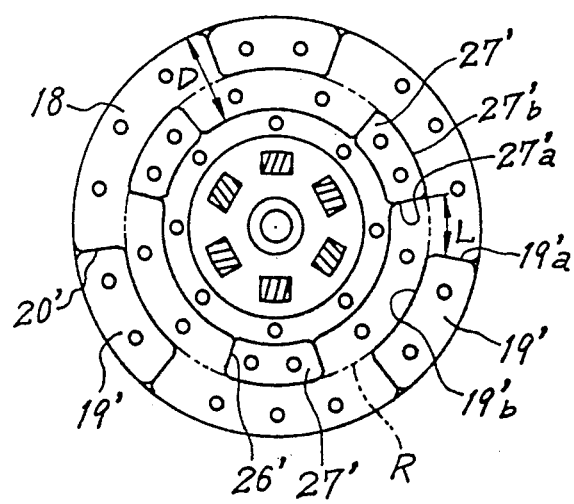

FIG. 6 shows further embodiment of the present invention, in which notched portions 20' and 26' are formed on an outer peripheral edge and an inner peripheral part of the organic facing 18. Ceramic-metallic facings 19' and 27' are arranged circumferentially in respect of notched portions 20' and 26'. Side edges 19' and 27' of the facings 19' and 27' are positioned with a prescribed width L kept between them in the circumferential direction and an outer peripheral edge 27'b of the ceramic-metallic facing 27' at an inner peripheral side lies on an approximately same circumference R (imaginary line) with an inner peripheral edge 19'b of ceramic-metallic facing 19' at an outer peripheral side. The facing is so devised that either of the ceramic-metallic facings 19' and 27' exists over the entire width D in the radial direction of the organic facing 18 viewed in the circumferential direction.

Circumferential side edges 19'a and 27'a of the ceramic-metallic facings 19' and 27' at the inner peripheral side and at the outer peripheral side are positioned with the prescribed distance L kept between them, so that the anti-bursting strength is very high. Further, either of the ceramic-metallic facings 19' and 27' exists over the entire width in the radial direction of the organic facing 18, so that its wear-resisting and heat-resisting properties are improved by a large margin.

As mentioned above, the following advantages can be obtained in accordance with the present invention:

(1) The anti-bursting strength can be increased high since the organic facing 18 is formed into the integral annulat piece.

(2) The framing work (notch shaping) becomes easier than a drilling work because recessions for incorporating the ceramic-metallic facings 18 (27) are provided by the notched portions 20 (26) on the organic facing 18. The organic facing 18 can be molded with a die, so that the forming work becomes easier.

(3) The organic facing 18 and the ceramic-metallic facing 19 are so devised that they are fixed to the driven plate 16 independently. Therefore when the organic facing 18 is replaced with a new one, for example, it is not required to simultaneously replace the ceramic-metallic facing 19 (27) to provide obvious economy. Further, since the ceramic-metallic facing 19 is arranged in the notched portion 20 one side (for example, the outer peripheral side) of which is opened, less labor is required in fitting the ceramic-metallic facing 19 into the notched portion 20 and fitting it onto the driven plate 16.

The ceramic-metallic facings 19 on both sides of the driven plate 16 are positioned in the same phase, i.e. the ceramic-metallic facings 19 are arranged at the same position in respect of both sides of the driven plate 16 in FIG. 4. However, the ceramic-metallic facings 19 can also be arranged in such a way that the deviate each other on both sides of the driven plate 16 in the circumferential direction.

The terms and expressions which have beem employed in the foregoing description are used as terms of description and not of limitation, and there is no intent, in the use of such terms and expressions, of excluding any equivalents of the features shown or described or portions thereof, but it is recognized that various modifications are possible within the scope of the invention claimed.

What is claimed is:

1. A clutch disk having a driven plate, said driven plate having on each of its opposite faces an organic friction facing extending circumferentially and continuously around the driven plate, each organic facing having a plurality of equally spaced notches extending radially inward from, and circumferentially along, the periphery of said driven plate, the peripheral edge of each of said notches being open for the circumferential length of said notches, a ceramic-metallic friction facing filling each of said notches; said organic facing, said spaced notches and said ceramic-metallic friction facing filling each of said notches at the opposite faces of said driven plate being aligned and fastening means extending through said aligned organic facings, said aligned ceramic-metallic facings and said driven plate and mounting said facings on said driven plate.

2. A clutch disk as set forth in claim 1, in which inner peripheral notched portions are located inwardly of and circumferentially between radial edges of adjacent outer peripheral notches at an inner peripheral edge of the organic facings, the inner peripheral edge of said notches being open for the length of each notch portion and ceramic-metallic facings are mounted in said inner peripheral notched portions and fixed to said driven plate.

3. A clutch disk as set forth in claim 2, in which the outer peripheral notched portions and inner peripheral notched portions with their corresponding ceramic-metallic facings are so arranged that either ceramic-metallic facing at an outer peripheral portion or at an inner peripheral portion exists over the entire circumference of the organic facing.

4. A clutch disk as set forth in claim 2, in which the outer peripheral notched portion and the inner peripheral notched portion are arranged with a prescribed distance kept between them in the circumferential direction.

5. A clutch disk as set forth in any one of claims 2, 3, 4 or 1, in which the organic facings and the ceramic-metallic facings are fixed onto the driven plate by means of rivets.

6. A clutch disk as set forth in claim 2, wherein said disk has three outer peripheral notched portions and 3 inner peripheral notched portions on each side of said driven plate.

7. A clutch disk as set forth in claim 1, in which ceramic-metallic facings are fixed in notches at the opposite sides of said driven plate by rivets passing through said facings and said driven plate.

8. A clutch disk as set forth in claim 7, in which said ceramic-metallic facings are each mounted in holders and said ceramic-metallic facings and said holders are fixed in notches at the opposite sides of said driven plates by rivets passing through said facings, said holders and said driven plate.

* * * * *